Sept. 28, 1943.　　　M. E. COLLINS　　　2,330,335
GALVANOMETER ADJUSTING ASSEMBLY
Filed June 17, 1941
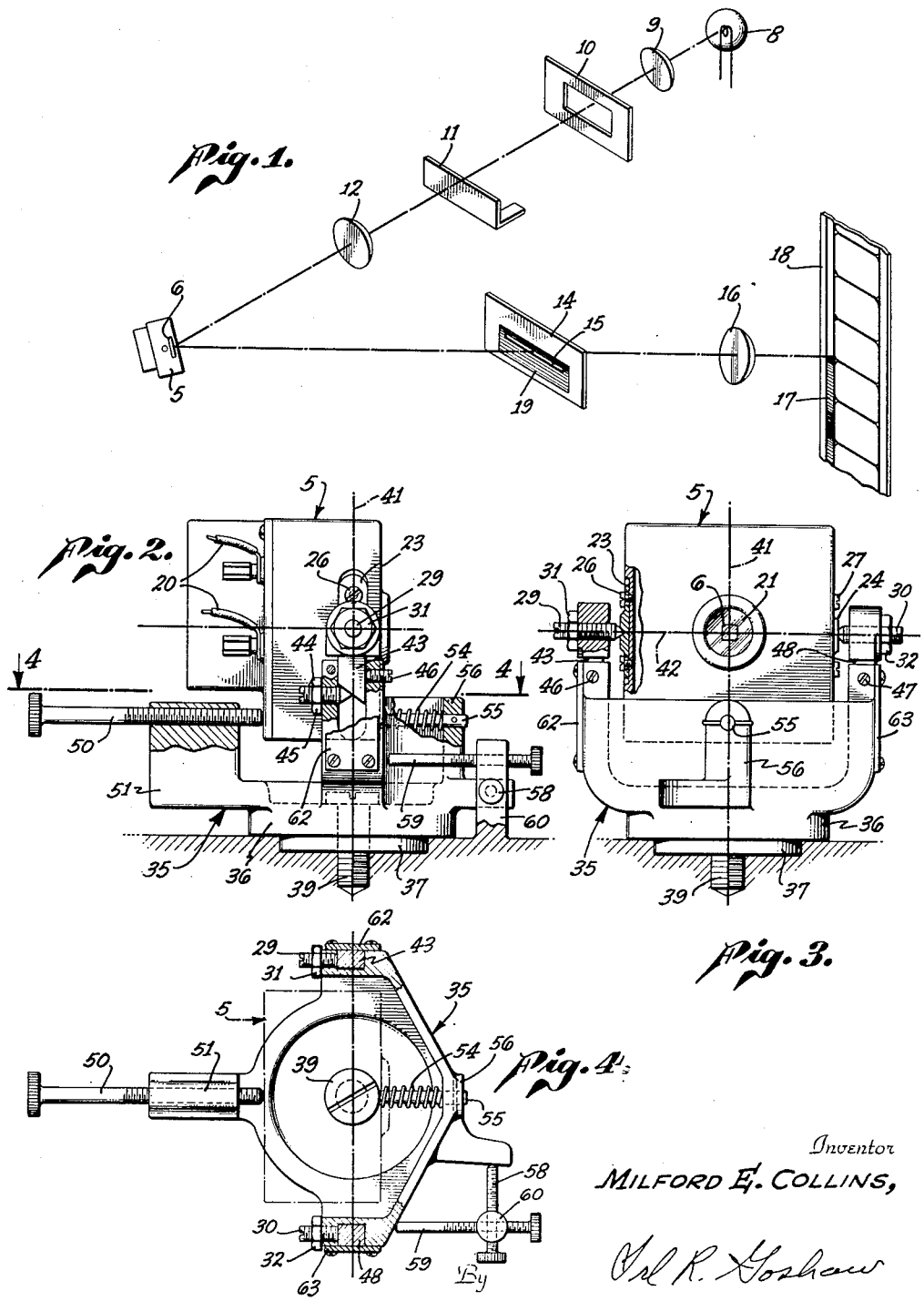
Inventor
MILFORD E. COLLINS,
Attorney Patented Sept. 28, 1943

2,330,335

UNITED STATES PATENT OFFICE 2,330,335

GALVANOMETER ADJUSTING ASSEMBLY

Milford E. Collins, Los Angeles, Calif., assignor to Radio Corporation of America, a corporation of Delaware Application June 17, 1941, Serial No. 398,412

8 Claims. (Cl. 248—278)

This invention relates to optical systems and particularly to an adjustable mounting for a galvanometer mirror.

In one type of standard commercial sound recording system, a source of light of constant intensity provides a light beam which is vibrated by a mirror for producing light variations on a film in accordance with sound waves being recorded. The light source generally lies in the same horizontal plane as the point on the light-sensitive material on which the light beam is being impressed. It is important, therefore, that the optical axis of the lenses and other elements intermediate the light source and film also lie in this plane, and it is particularly essential that the central point on the mirror be in this plane.

In the recording of variable area sound tracks, the galvanometer mirror should be laterally adjustable with respect to the light source and film and also rotationally adjustable to provide the proper direction of projection of the light beam. For variable density recording, however, wherein a penumbra shadow is formed and is vibrated by the galvanometer mirror to produce striations on the film of densities corresponding to the amplitude of the sound waves being recorded, it was found that additional adjustments are desirable. That is, it was found that the galvanometer mirror should be properly oriented to insure that the image of the filament completely filled the mirror and that at least one edge of the mirror was parallel to the slit.

The principal object of the invention, therefore, is to facilitate the adjustment of an optical element in all directions.

Another object of the invention is to provide rotational adjustments of an optical element in three directions, and vertical and horizontal adjustments in two directions.

A further object of the invention is to provide a galvanometer mounting which permits adjustments in all directions.

A further object of the invention is to provide a galvanometer mounting which will permit accurate vernier adjustments in all directions.

Although the novel features which are believed to be characteristic of this invention will be pointed out with particularity in the appended claims, the manner of its organization and the mode of its operation will be better understood by referring to the following description read in conjunction with the accompanying drawing forming a part thereof in which Fig. 1 is a diagrammatic drawing of the optical portion of a sound recording system;

Fig. 2 is a side elevational view of the galvanometer mounting embodying the invention;

Fig. 3 is a front elevational view of the galvanometer mounting of Fig. 2; and

Fig. 4 is a view of the galvanometer taken along the line 4—4 of Fig. 2.

Referring now to Fig. 1, the galvanometer 5 with its mirror 6 is shown at the apex of a triangular optical system comprising a lamp 8, collecting lens 9, an aperture mask 10, a fixed stop 11 for producing a penumbra shadow, a projecting lens 12, a slit mask 14 with a slit 15 therein, and an objective lens 16 for projecting light on the sound track portion 17 of a motion picture film 18. Although not essential, it has been found that the most practical arrangement is to have the optical axis of the above-described system in the same horizontal plane. It is to be understood, however, that the galvanometer mounting adjustments would also function if the optical axis were in another plane.

In the system just described the mirror 6 is vibrated on a horizontal axis for the purpose of moving a penumbra shadow 19 vertically across a slit 15, the intensity of the light passing to the sound track area 17 being a function of the amplitude of vibration of the mirror 6 and, consequently, of the sound waves being recorded. In operation of such a system, the mirror should not be positioned below or above or laterally offset with respect to the optical axis, otherwise a linear relationship between the amplitudes of vibration of the mirror and the light intensity on the film will not be obtained. Also, if the axis of vibration is not horizontal, this linear relationship will not exist between the light intensities and mirror excursions. Furthermore, the image of the light source must completely fill the mirror 6, while the lower edge of the mirror must be parallel with the slit 15, any maladjustment in these respects producing distortion in the recording. Thus, it is necessary that easily accessible and readily adjustable means be provided for adjusting the mirror in all directions.

Referring now to the remaining figures in which like elements are given identical numbers, the galvanometer mirror 6 is mounted in a case and current is fed to the galvanometer through a pair of leads 20. The galvanometer case is rectangular in shape and has a window 21 therein through which light passes to and from the mirror 6. Along each vertical side of the galvanometer are shown adjustable trunnion seat plates 23 and 24, these seats being slidable vertically in grooves in the case and in elongated holes in the plates 23 and 24 and held in position by screws 26 and 27, respectively. The trunnion seats accommodate a pair of pointed trunnion screws 29 and 30 which are locked in position by respective nuts 31 and 32.

The trunnions are mounted on the ends of the legs of a yoke 35, said yoke having a base portion 36 which is machined to form an annular hub section 37 and drilled to accommodate a bolt 39. Thus, the entire yoke 35 may be rotated, thus rotating the mirror about a vertical axis 41 to position the face of the mirror perpendicular to a line bisecting the angle formed by the optical axis lines between the lamp 8 and mirror 6 and between the transition point on the film 17 and mirror 6.

Referring again to the seat plates 23 and 24, an appreciable distance is provided between these plates and the ends of the yoke 35 in which the screws 29 and 30 are positioned. This permits the galvanometer 5 to be moved laterally along a horizontal axis 42 so that the center or the mirror will lie in the axis 41. This is accomplished by backing one trunnion off while advancing the other according to the direction of adjustment desired.

The ends of the yoke in which the trunnions 29 and 30 are mounted are eye studs 43 and 48 slidable in grooves in the legs of the yoke and held in place by plates 62 and 63. The lower ends of the studs are beveled and rest against the truncated ends of setscrews, one of which is shown at 44, and which are tightened by nuts, such as shown at 45. Thus, by rotation of these screws, the studs 43 and 48 may be raised or lowered. By raising or lowering only one stud, a rotational adjustment is provided although it is generally necessary to lower one stud if the other is raised in order to keep the center of the mirror at the intersection of the axes 41 and 42 and maintain the mirror in a position so that the image of the filament of the light source completely fills the mirror. There is thus provided a rotational adjustment for making the pertinent edge or edges of the mirror parallel to the long sides of the slit in the mask 14. By means of setscrews 46 and 47, the studs 43 and 48, respectively, may be locked in their final adjusted position.

By the use of beveled stud ends and screws, a very accurate vernier action is obtained since the above adjustments of the mirror are particularly important in variable density sound recording. By raising and lowering both pivot points, a vertical translation of the mirror along the axis 41 is obtainable to position the rotational axis of the mirror completely within the plane of the optical axis of the system. This vertical adjustment, together with the horizontal adjustment of the trunnion screws 29 and 30, provides easily operable means for properly positioning the mirror.

Referring now to Figs. 2 and 4, a knurled threaded screw 50 is shown mounted in a vertically extending flange 51 of the base of the yoke 35. Thus, bearing against one side of the lower portion of the galvanometer is the end of the screw 50, while bearing against the opposite side of the galvanometer is the end of a stud 55 slidable in a hole in a flange 56 of the yoke base. The stud 55 is urged toward the galvanometer by a spring 54. Thus, by rotating the bolt 50 against or with the pressure of the spring 54, a rotational effect of the galvanometer is obtained about the trunnion screws 29 and 30.

As mentioned above, the galvanometer is rotatable about the vertical axis 41 passing through the center of stud bolt 39. Control of this adjustment is accomplished by a pair of threaded finger screws 58 and 59, threaded through a mounting post 60 on the bed of the recorder or other apparatus on which the galvanometer is mounted. Thus, by loosening the bolt 39, it is possible to obtain fine rotational adjustments of the entire galvanometer mounting structure by manipulation of the screws 58 and 59, the yoke being held in position by tightening the bolt 39.

The above description outlines five adjustments which may be made with vernier precision. First, rotation of the mirror about a vertical axis such as 41 is obtainable by the screws 58 and 59 and bolt 39. Secondly, the galvanometer is rotatable about the horizontal axis 42 by means of the bolt 50 and spring 54. Thirdly, the galvanometer may be raised and lowered along the axis 41 by simultaneous raising and lowering of the trunnions 29 and 30 by the screws 44. Fourth, horizontal adjustment along the axis 42 is obtainable by the backing off and forward movement of the trunnion screws 29 and 30. Fifth, a rotational adjustment is obtainable about an axis passing through the intersection of axes 41 and 42 and perpendicular to the paper of the drawing, the latter being accomplished by the alternate raising and lowering of the trunnion screws 29 and 30. This latter adjustment is facilitated by the trunnion seat plates 23 and 24 which may be set to provide a rough adjustment of the galvanometer in this respect, after which the screws operating on the beveled ends of studs 43 and 48 provide the vernier adjustment. Thus, the bracket construction is particularly flexible to accomplish all necessary adjustments required and adjustments which may be readily and accurately made by an operator.

What I claim as my invention is:

1. A mounting for a galvanometer mirror adapted to be vibrated in accordance with sound waves to be recorded comprising, a yoke, trunnions mounted in said yoke for supporting said galvanometer, a rotatable base for said yoke, means for rotating said base and said yoke, means for rotating said galvanometer on said trunnions, and means for adjusting said trunnions parallel with the legs of said yoke.

2. A mounting in accordance with claim 1 in which said last-mentioned means comprises vertical studs slidably mounted in the ends of said yoke, said studs having tapered ends, and respective screws bearing against said tapered ends for adjusting the position of said studs in the ends of said yoke.

3. A mounting for a galvanometer comprising a yoke, a pair of trunnions in the ends of said yoke between which said galvanometer is mounted, a base for said yoke adapted to be rotated for rotating said galvanometer about a vertical axis, means bearing against one edge of said galvanometer for rotating said galvanometer about a horizontal axis, and means for slidably mounting said trunnions in the ends of said yoke and parallel with the legs thereof, said means including studs for raising and lowering said trunnions along said vertical axis and for rotating said galvanometer about a second horizontal axis perpendicular to said first-mentioned horizontal axis.

4. A mounting for a galvanometer in accordance with claim 3 in which said trunnions include screws threaded in said trunnions, said screws being movable toward and away from said galvanometer and adapted to shift said galvanometer along said first-mentioned horizontal axis.

5. A mounting for a galvanometer in accordance with claim 3 in which trunnion seat plates are provided between said trunnions and said galvanometer for adjusting the pivot points about which said galvanometer is rotatable on said trunnions in a direction parallel with the legs of said yoke.

6. A galvanometer adjusting means comprising a yoke, a base for said yoke for the rotation thereof about a vertical axis, a stud slidably mounted in each end of said yoke, each stud having an inclined end surface, a screw bearing against said inclined surface, the adjustment thereof raising and lowering said stud in the end of said yoke, an adjustable screw through each of said studs on which said galvanometer is suspended, and means adapted to accommodate the ends of said adjustable screws and mounted along the sides of said galvanometer for positioning said screws with respect to said galvanometer.

7. A mounting for a galvanometer mirror adapted to rotate said mirror about a plurality of axes substantially intersecting at the center of said mirror and translate said mirror along two of said axes, said mounting comprising a rotatable yoke adapted to rotate said mirror about a vertical axis, means mounted on the base of said yoke for rotating said mirror about a horizontal axis, and means mounted on the ends of said yoke for rotating said mirror about a second horizontal axis perpendicular to said first-mentioned horizontal axis, said last-mentioned means being adapted to translate said mirror along said vertical axis and along said first-mentioned horizontal axis.

8. A mounting in accordance with claim 7 in which said last-mentioned means comprises studs slidable in the ends of said yoke, aligned horizontal pivot screws extending through said studs and adjustable toward and away from said mirror, and means for holding said studs in position in the ends of said yoke.

MILFORD E. COLLINS.